April 10, 1934.  C. F. SHERMAN  1,954,652
POWER PRESS
Filed Feb. 27, 1932
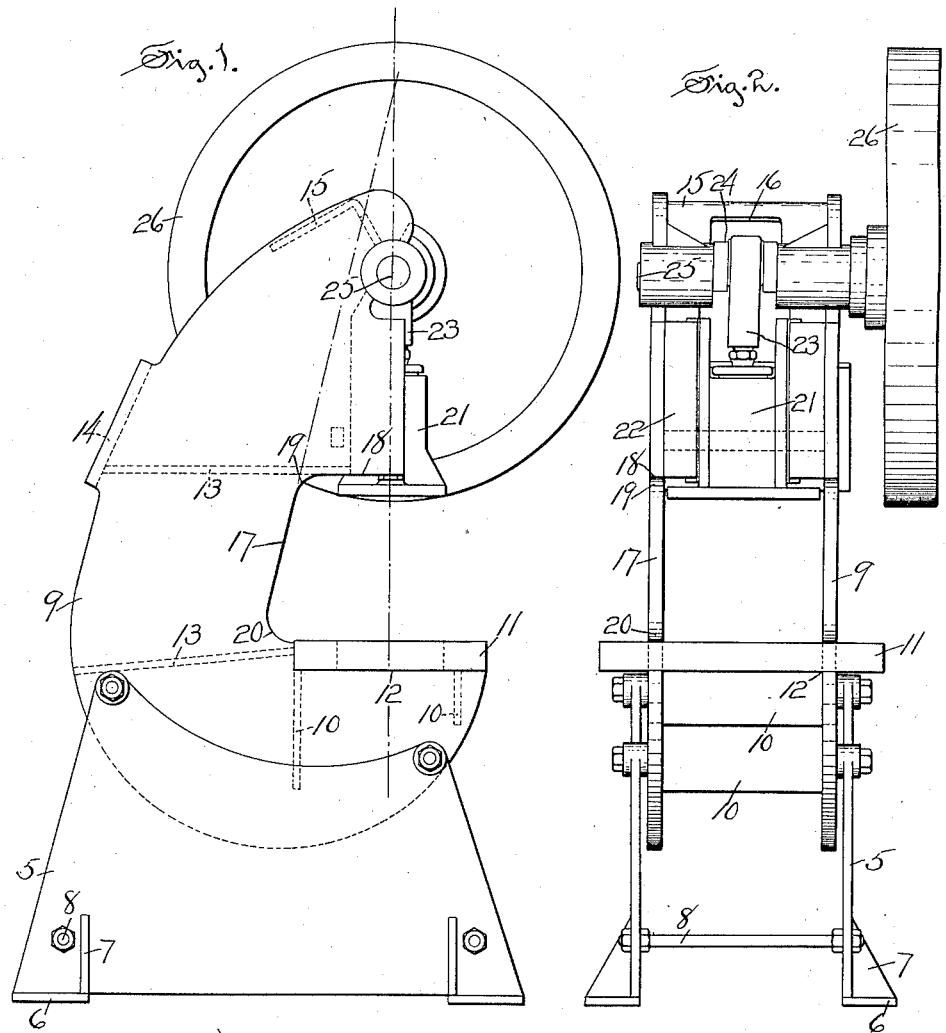

Patented Apr. 10, 1934

1,954,652

UNITED STATES PATENT OFFICE 1,954,652

POWER PRESS

Cortis F. Sherman, Hartford, Conn., assignor to The Henry & Wright Manufacturing Company, Hartford, Conn., a corporation of Massachusetts Application February 27, 1932, Serial No. 595,527

5 Claims. (Cl. 153—21)

My invention relates to the class of machines embodying a bed or die plate and a power operated plunger in the operation of which great pressure is applied to articles or devices supported by said bed or die plate as a result of the action of the plunger, and an object of my invention, among others, is the production of a machine of this class in which the frame of comparatively light construction shall be strong enough to successfully withstand all pressures that may be applied by the plunger or slide in its operation.

One form of a machine embodying my invention and in the construction and use of which the objects herein set out, as well as others, may be attained is illustrated in the accompanying drawing, in which—

Figure 1 is a view in side elevation of my improved press.

Figure 2 is a front view of the same.

Figure 3 is a view on reduced scale illustrating a little different arrangement of the machine.

My improved machine is illustrated and described herein in connection with a stamping or punch press, although it is not limited to use in such a machine. It is composed mostly of pieces of sheet metal which are welded together in a manner to produce a machine frame that in effect is a single piece of metal, the joints, in fact, being as strong or stronger than the metal plates or pieces composing the plates, but I have so constructed and arranged the parts that notwithstanding their light character they will successfully withstand any forces that may be applied to the structure in the ordinary uses of the machine, or even in extraordinary uses of the machine.

This machine is illustrated in the accompanying drawing in which there is embodied a base frame and a machine frame preferably secured together as by means of bolts or similar fastenings. The base frame comprises side plates 5 that are stamped out from sheet metal and having feet 6 secured to the bottoms thereof to afford support therefor, said feet being stamped from sheet metal and secured in place by welding. Braces 7 also formed from sheet metal are secured by welding in the angle between the feet and the sides 5 to provide strength. Tie rods 8 may be secured to the sides 5, extending across the spaces between them to impart rigidity to the structure.

The machine frame comprises side plates 9 that are likewise formed from sheet metal stamped to shape, tie plates 10 cut or stamped from sheet metal being secured by welding at their ends to the inner surfaces of the side plates 9 and extending across the space between said plates, and as shown in Figures 1 and 2 of the drawing. These tie plates 10 are disposed vertically underneath a die plate 11 mounted on die plate seats 12 formed at the bottom of gaps cut into the front edges of the plates 9 for a purpose to be hereinafter described. The plate 11 is somewhat thicker than the plates 9 and is secured in place by welding, the tie plates 10 also providing supports for the die plate that rests upon the upper edges of such tie plates. These tie plates also support the side plates to prevent distortion of the latter under forces applied to the die plate.

Other tie plates 13 are secured by welding to the inner surfaces of the side plates 9, these plates 13 extending substantially horizontally, and a back plate 14 is also secured in like manner to the back edges of the side plates. A top plate 15 of angular shape is secured by welding to the inner surfaces of the side plates at the top thereof and extends across the space between said plates, and a notch 16 is formed in the top plate to provide clearance for the crank on the crank shaft to be hereinafter referred to.

The gaps, hereinbefore referred to, cut into the front edges of the side plates 9, comprise a recess to receive the die plate 11 as hereinbefore described and also to receive the lower end of the plunger that operates in said recess, and this recess is of particular construction to impart excessive strength to the machine frame. The top and bottom edges of the gap are substantially parallel, but the back edges comprising the throat are disposed obliquely with respect to a vertical plane extending through the center of the plunger of the machine, said edges, comprising the throat 17, being connected with the top edges 18 of the gap by a top curve 19 extending tangentially to the edges 17 and 18. A bottom curve 20 is formed on the edge of each side plate tangentially to the edge comprising the throat 17 and also tangentially to a plane parallel with the die plate seats 12 and tangential to the die plate 11.

In the preferred form the edges comprising the throat 17 are formed straight, as shown in Figure 1, although extremely satisfactory results will be obtained if the throat is made curved, in either event, this throat extending tangentially to the curves 19 and 20.

While I do not confine myself to an inclination of any particular degree with respect to a plane passing lengthwise through the center of the plunger, yet, I have found extremely satisfactory results to flow from a structure in which this inclination is such that it will intersect said plane outwardly or above the axis of the crank shaft. Similarly while I do not limit myself to the curves 19 and 20 of any particular radius, yet, I have found most satisfactory results to flow from a structure in which the radii of these curves are greater than one-tenth of the minimum distance from a plane extending lengthwise through the center of the guides and the angularly disposed edges comprising the throat 17.

A plunger or slide 21 is mounted in slide-ways in the upper part of the machine frame in any ordinary manner, guide plates 22 being secured by welding to the front edges of the plates 9. The plunger is connected as by means of a pitman 23 with the crank 24 of a crank shaft 25 to which a flywheel 26 is secured in a manner common to presses of this type.

In machines of this type as commonly heretofore constructed the strains incident to the pressure of the plunger against the dies have been localized at points between the throat and surfaces supporting the dies or between such throat and the top edge of the gap in the frame so that rupture commonly takes place at these points. In the use of my improved machine illustrated and described herein I have determined by photographs which penetrate the metal that under the usual operative forces these strains are removed from the points above mentioned, the formation of the throat 17 and the curves 19 and 20 effecting this result thereby producing a frame which will successfully resist all of the forces applied in the operation of the machine, said strains being distributed over a large expanse of the frame. As shown in Figure 3 the throat 17 is formed on a curve which joins the top and bottom edges of the gap by curves tangentially arranged.

I claim:

1. A power press comprising a frame, an actuating shaft journaled in said frame, a plunger guided in ways in the frame, a connection between the actuating shaft and the plunger to operate the latter, said frame being composed of metal plates formed to shape and welded to comprise an integral unit, bearings for said actuating shaft in said frame substantially in line with the axis of said plunger, slideways for said plunger below said shaft, each plate comprising said frame having a gap with substantially parallel upper and lower edges and a back comprising a throat obliquely disposed with respect to a plane located centrally of said plunger lengthwise thereof and extending crosswise of the machine, said gap having its opposite edges arranged substantially parallel and joined with said throat by curves extending tangentially to said throat and edges.

2. A power press comprising a frame, an actuating shaft journaled in said frame, a plunger guided in ways in the frame, a connection between said shaft and plunger to operate the latter, said frame being composed of metal plates formed to shape and welded to comprise an integral unit, a bearing for said actuating shaft in said frame substantially in line with the axis of said plunger, slideways for said plunger below said shaft, each plate comprising said frame having a gap with substantially parallel upper and lower edges and a back comprising a throat formed on a curve obliquely disposed with respect to a plane located centrally of said plunger lengthwise thereof and extending crosswise of the machine, said gap having its opposite edges arranged substantially parallel and joined with said throat by curves extending tangentially to said throat and edges.

3. A power press comprising a frame, an actuating shaft journaled in said frame, a plunger guided in ways in the frame, a connection between the actuating shaft and plunger to operate the latter, said frame being composed of metal plates formed to shape and welded to comprise an integral unit, bearings for said actuating shaft in said frame, slideways for said plunger below said shaft, said frame having a gap with a back comprising a throat obliquely disposed to intersect, beyond said bearings, a plane located centrally of said plunger lengthwise thereof and sidewise of the machine, said gap also having its opposite edges arranged substantially parallel and joined with said throat on curves extending tangentially to said throat and edges.

4. A power press comprising a frame, an actuating shaft journaled in said frame, a plunger guided in ways in the frame, a connection between the actuating shaft and plunger to operate the latter, said frame being composed of metal plates formed to shape and welded to comprise an integral unit, a bearing for said actuating shaft in said frame, slideways for said plunger below in said shaft, said frame having a gap with a back comprising a throat obliquely disposed with respect to a plane located centrally of said plunger lengthwise thereof and sidewise of the machine, said gap having its opposite edges arranged substantially parallel and joined with said throat by curves extending tangentially to said throat and edges, the radii of said curves being greater than one-tenth of the minimum distance from said plane of the plunger to the angularly disposed throat.

5. A power press comprising a frame, an actuating shaft journaled in said frame, a plunger guided in ways in the frame, a connection between the actuating shaft and the plunger to operate the latter, said frame being composed of metal plates having substantially the same ultimate tensile and compressive strength cut and formed to shape and welded to comprise an integral unit, bearings for said actuating shaft in said frame, slideways for said plunger below said shaft, said frame having a gap with a back comprising a curved throat joined with the upper and lower edges of said gap by curves tangentially arranged with respect to said throat and the upper and lower portions of the gap, the curves of said throat being so disposed that a straight line through the points of tangency will intersect a plane located centrally of said plunger lengthwise thereof and sidewise of the machine at a point beyond said actutating shaft.

CORTIS F. SHERMAN.